Dec. 5, 1950     J. B. CATALDO ET AL     2,533,187
DOUBLE-ACTING SOLENOID
Filed Feb. 21, 1948     2 Sheets-Sheet 1
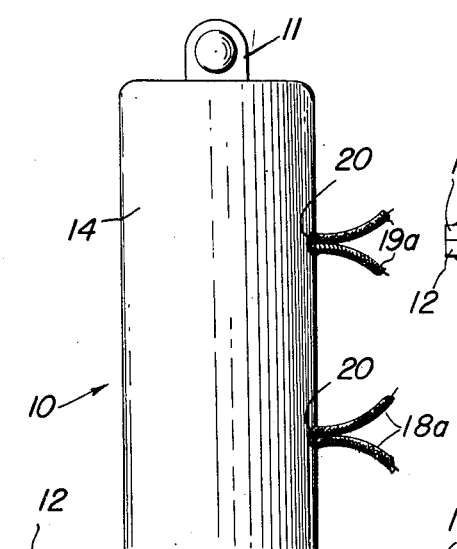
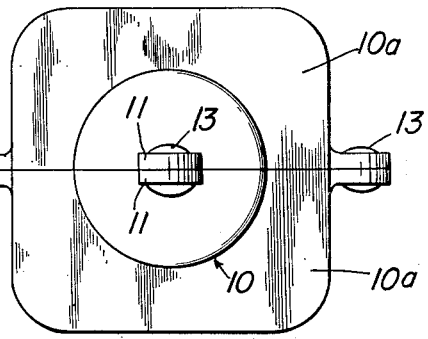
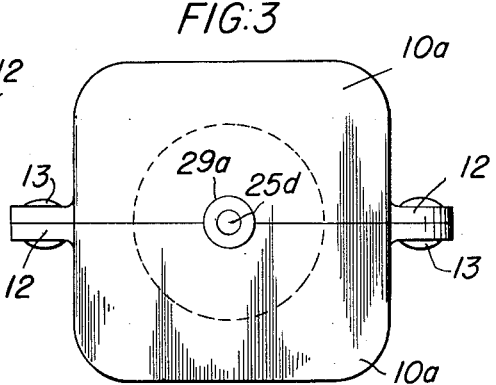
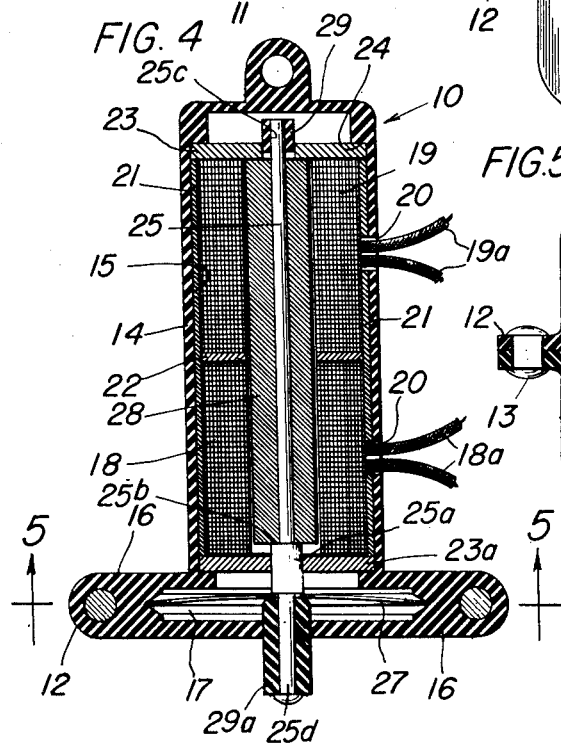
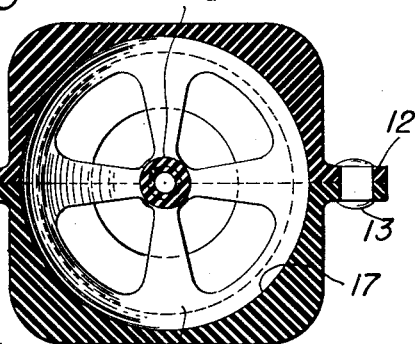
INVENTORS
JOHN B. CATALDO
KENNETH E. VROOM
BY
Attorney Dec. 5, 1950   J. B. CATALDO ET AL   2,533,187
DOUBLE-ACTING SOLENOID
Filed Feb. 21, 1948   2 Sheets-Sheet 2
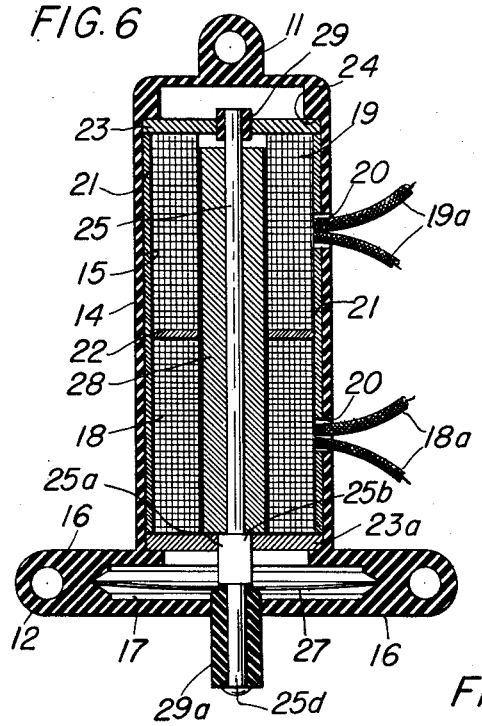
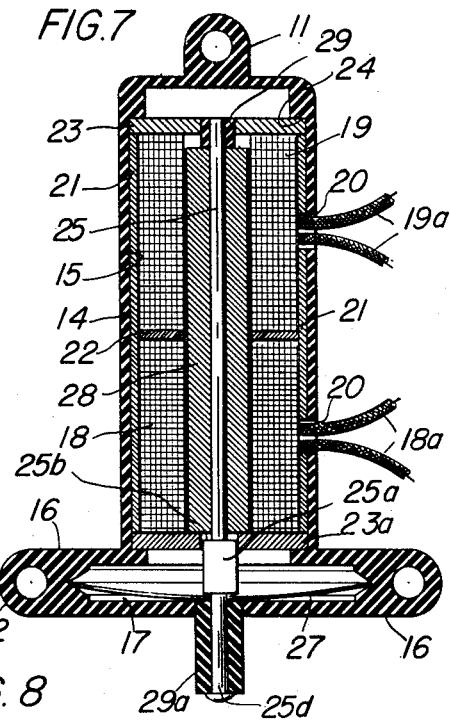
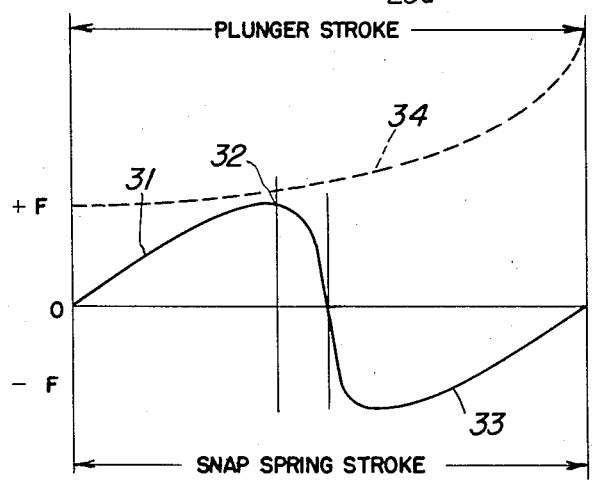
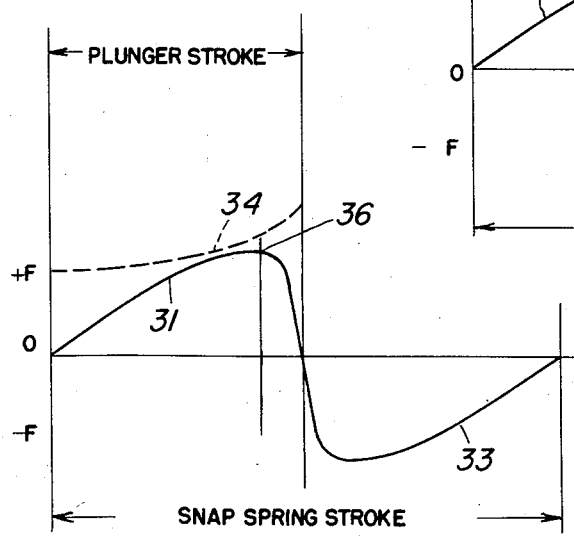
INVENTORS
JOHN B. CATALDO
KENNETH E. VROOM
BY
Attorney Patented Dec. 5, 1950

2,533,187

UNITED STATES PATENT OFFICE 2,533,187

DOUBLE-ACTING SOLENOID

John B. Cataldo, Annandale, and Kenneth E. Vroom, Summit, N. J., assignors to John B. Pierce Foundation, New York, N. Y., a corporation of New York Application February 21, 1948, Serial No. 10,164

3 Claims. (Cl. 175—337)

The invention relates to improvements in the construction of double-acting solenoids in which snap springs act to position the plunger. It is an object of the invention to employ a smaller solenoid than has heretofore been considered necessary for producing a given amount of work. It is another object of the invention to improve the construction and design of the parts making up such a solenoid for economy of manufacture and assembly.

In normal solenoid construction, the plunger is a direct part of the main shaft; hence it is necessary that the travel of the work-producing shaft be equal to the plunger travel. If the plunger travel of a solenoid of the type of this invention could be decreased and still produce the same shaft travel, the resulting work would require less energy on the part of the solenoid in combination with the snap spring. This is true because the plunger travel is equal to the magnetic air gap and decreasing this for the same required force, also decreases the required energy. Pursuant to the invention the desired result is accomplished by making the shaft separable from the plunger with stops or shoulders on either side of the shaft for the plunger to work against. In application with a snap spring, having two positions of stable equilibrium, which spring is directly fastened to the main shaft, the plunger is made to push against one of the shaft shoulders to the limit of its travel. At that point the snap spring has stored sufficient energy within itself to continue the stroke of the main shaft unaided. In this manner, then, solenoid energy is required only to bring the snap spring to its flipping point.

For convenience in manufacture and assembly of the solenoid, all parts are placed in a two-piece housing with projections for automatic alignment and positioning.

The foregoing objects as well as additional objects, advantages and features of the invention will be readily apparent from the following detailed description and accompanying drawings, illustrating a preferred embodiment of the invention, and wherein:

Fig. 1 is an elevational view of one embodiment of the device pursuant to the invention.

Fig. 2 is a top plan view of the device of Fig. 1.

Fig. 3 is a bottom plan view of the device of Fig. 1.

Fig. 4 is a central, longitudinal, sectional view of the device illustrating the initial position of the work-shaft and plunger assembly with the plunger in attracted upward position and the work-shaft in retracted upward position, the assembly being retained by the action of the resilient snap-spring means.

Fig. 5 is a transverse sectional view taken on line 5—5 of Fig. 4.

Fig. 6 is a view similar to Fig. 4 but illustrating the attracted downward position of the plunger carrying the resilient snap-spring to its tripping point where it is about to complete the stroke of the work-shaft unaided by solenoid energy.

Fig. 7 is a view similar to Fig. 4 but illustrating the extended position of the work-shaft at the completion of its stroke and prior to its restoration to its initial position shown in Fig. 4 by the reverse movement of the plunger.

Fig. 8 is a diagram illustrating graphically the solenoidal energy required where the plunger stroke is equal to the snap spring throw, as exemplified in conventional solenoidal constructions.

Fig. 9 is a diagram illustrating graphically the solenoid energy required to trip the snap-spring if the plunger is stopped at the trip point of the snap spring, as exemplified in the practice of the present invention.

Referring to the embodiment of the invention illustrated in Figs. 1–5 of the drawings, the components of the device are shown conveniently assembled within a housing 10 of suitable material, which preferably comprises a pair of complementary symmetrical portions 10a. Each housing portion 10a may be formed with an integral top lug 11 and a pair of oppositely disposed lateral lugs 12 which serve to hold said housing portions to one another as by means of screws or rivets 13 passing through said lugs. The main body portion 14 of housing 10 defines a cylindrical chamber 15 therewithin for retaining the major components of the device while the base portion 16 thereof defines another chamber 17 for retaining the resilient means affixed to the work-shaft, as will be more fully described hereinbelow.

Referring to the embodiment illustrated in Figs. 1 through 7, the two coils for operating the solenoid are designated 18 and 19, respectively, 18 being the "on" coil and 19, the "off" coil. In the embodiment here illustrated, the "off" coil 19 is mounted above the "on" coil 18. The terminals of coil 18 are designated 18a, 18a, and the terminals of the coil 19 are designated 19a, 19a. These terminals extend through the suitable openings 20, 20 in the housing 10.

The housing 10 is shown constructed to position the coil-plunger magnetic shell assembly positively to a nicety, as appears presently.

Coils 18 and 19 of duplicate outer periphery, are encased in a magnetic shell 21, and held separated from one another by the steel spacing disc 22. To complete the magnetic circuit, end plates 23, 23a of magnetic material, are placed against the coil ends and against the magnetic shell. The interior wall construction of the housing 10 is provided adjacent the upper portion of its cylindrical inner chamber 15 with a circular shoulder 24, one-half of the circular shoulder being formed within each of the halves 10a, 10a.

A shaft 25, of non-magnetic material, is constructed to have its lower end 25a of large diameter for co-operation with the snap spring 27 and its body portion reduced to a small diameter to reciprocate within a plunger 28, thereby presenting a shoulder 25b for cooperation with the plunger 28. The plunger 28 is formed of magnetic material and is movable within the coils responsive to their respective magnetic fluxes. Thus, in the embodiment illustrated, the plunger moves upwardly into "off" position under the influence of the magnetic flux of the "off" coil 19. Conversely, the plunger 28 moves downwardly into "on" position under the influence of the magnetic flux of the "on" coil 18.

As illustrated in Figs. 4, 6 and 7, the snap spring 27 is held within the chamber 17 substantially at right angles to the axis of the shaft 25. The peripheral edge of the snap spring bears against the peripheral wall of the chamber where it is confined by reason of the form of such peripheral wall. Clearly the snap spring 27 may be positioned within the chamber 17 before the complementary portions 10, 10 are fastened together.

A sleeve 29 of non-magnetic material is made fast to the opposite end of the shaft 25, by brazing or the like means as at 25c, to act as a shoulder on the shaft against which the plunger 28 may act during reverse action. The extension 29a of any suitable material and the shaft 25, are threadedly connected, the threaded end 25d of the shaft 25 extending through the central opening in the snap spring 27, the large diameter end 25a and the extension 29a being disposed on either side of the snap spring 27 to effectively tie the spring to the shaft 25. The shaft 25 may actuate any desired electrical contact assembly or any other mechanism requiring positioning action by action of its end 25d.

The operation of the essential component parts of the solenoidal assembly is comparatively illustrated in Figs. 4, 6 and 7. In the position shown in Fig. 4, the snap spring 27 is in its upper stable position, and thereby holding the plunger-shaft assembly in upward position, namely by, virtue of the shoulder 25b on the shaft 25. The plunger 28 is also held in its upper position against the upper end plate 23 where it had been actuated by the "off" coil 19 in a previous operation. It will be observed that the shoulder 25b on the shaft 25 below the lower end of the plunger 28 is positioned on the shaft 25 above its connection with the snap spring a distance equal to the distance between the lower end of the plunger in its "off" position and the connection of the shaft 25 with the snap spring 27 in its upper position of stable equilibrium. Thus the snap spring supports the plunger in "off" position through the shoulder 25b on the shaft 25.

It is understood that the coils 18, 19 are energized by any electrical current, preferably of low voltage, thus enabling the coil circuits to be formed of small diameter conductors. Such conductors extend through the terminals of any suitable "on" or "off" push buttons.

"On" coil 18 is effective in actuating the plunger 28 downwardly to engage the lower end plate 23a, as appears from Fig. 6. By such action the plunger 28 has forced the shaft 25 and the snap spring 27 downwardly to their respective positions as shown in Fig. 6, from which position the snap spring continues its further downward throw by reason of its spring characteristics, thus completing the full stroke of the shaft, as indicated in Fig. 7. Fig. 7 illustrates the plunger 28 still in its position as shown in Fig. 6, namely in engagement with its stop, i. e. lower end plate 23a. The shaft 25, however, has continued for its stroke until the sleeve 29 on the opposite end of the shaft has contacted the plunger 28, and the end 25d of the shaft has attained its extreme position beyond the housing.

Having thus completed the full downward movements of the stated assembly of the essential parts of the solenoid, the assembly is now prepared to be returned to the stated first positions of these parts as shown in Fig. 4, namely, by energization of the "off" coil 19.

The manner in which the employment of the slideable plunger about a shaft reduces the energy required to operate the solenoidal assembly, is depicted in the comparative graphic diagrams Figs. 8 and 9, of coordinate lines of reference. Fig. 8 shows the solenoidal energy required for fully completing the throw of a plunger for the full throw of a snap spring. The solid line 31 designates the force curve of one type of snap spring. Positive force is required to move the spring to its tripping point, indicated at 32, after which the spring will move for the remainder of the throw unaided by virtue of its stored energy, and is depicted on the graph by entrance of the curve into the negative force region, see 33. The force curve of a typical solenoid plunger with a flat-faced stop is represented by the dotted line 34. In general, the force increases inversely as the square of the gap distance which is indicated by the rapid rise in force at the end of its stroke. To trip the snap spring the plunger force must be greater than the snap spring force at the tripping point. This is shown on Fig. 8 at the point 32. Since the snap spring is capable of travelling unaided, any solenoidal energy beyond this point serves little or no purpose and can be considered to be wasted.

Fig. 9 illustrates the solenoidal energy required to trip the snap spring if the plunger is stopped at the tripping point 36 of the spring, pursuant to the instant invention. This point is variable for various types of snap springs but for the purposes of the instant invention can be considered to be approximately 50 per cent of its full throw. For this condition, then, the plunger stroke is now approximately half of that of the conditions in Fig. 8. Since the plunger forces in magnetic circuits generally vary inversely as the square of the air gap distance, the solenoidal energy required to perform the work of Fig. 8, with the conditions of Fig. 9 would be decreased in the same proportion. The practical results therefore are a solenoid of decreased size and decreased operating current.

We claim:

1. A solenoid assembly comprising a casing; an "on" coil disposed within said casing adjacent one end thereof; and "off" coil having a diameter substantially equal to that of said "on" coil disposed within said casing adjacent the other end thereof and coaxially with said "on" coil; a plunger of magnetic material movable within said coils responsive to the respective magnetic fluxes thereof from a position in contact with one end of said casing and out of contact with the other end thereof to a position in contact with the opposite end of said casing and out of contact with the other end thereof, said plunger having a central axial bore therethrough; a shaft of non-magnetic material positioned for axial movement within the bore of said plunger and movable beyond the respective ends of said casing, said shaft having a shoulder thereon beyond each end of said plunger to limit movement of said shaft within the bore of said plunger and to cooperate with said plunger for movement of said shaft thereby; and a snap spring having two positions of stable equilibrium connected to said shaft, said snap spring being positioned to hold one shoulder of said shaft against the end of said plunger adjacent thereto when that end of said plunger is not in contact with its adjacent end of said casing, and to hold the other shoulder of said shaft against the end of said plunger adjacent thereto when that end of said plunger is not in contact with its adjacent end of said casing whereby solenoid actuated movement of said plunger in the direction of the shaft shoulder in contact therewith moves said snap spring past dead center as said plunger contacts the end of said casing, and whereby said snap spring continues movement of said shaft until said snap spring reaches a position of stable equilibrium.

2. In a vertically-positioned solenoid assembly, an "on" coil; an "off" coil mounted above said "on" coil having a diameter substantially equal to that of said "on" coil disposed coaxially therewith; a plunger of magnetic material movable within said coils responsive to the respective magnetic fluxes thereof, said plunger having a central axial bore therethrough; a shaft of non-magnetic material positioned for axial movement within the bore of said plunger, said shaft having an upper shoulder thereon above the upper end of said plunger and a lower shoulder thereon below the lower end of said plunger to limit movement of said shaft within the bore of said plunger and to cooperate with said plunger for movement of said shaft thereby; and a snap-spring, having an upper and a lower position of stable equilibrium, connected to said shaft for providing continuing movement of said shaft in the same direction after limited initial movement thereof by the plunger to a position just beyond dead center of said snap-spring; said lower shoulder being positioned on said shaft above its connection with the snap-spring a distance equal to the distance between the lower end of said plunger in its "off" position and said connection when the snap spring is in its upper position of stable equilibrium; and the upper shoulder being positioned on said shaft above its connection with the snap-spring a distance equal to the distance between the upper end of the plunger in its "on" position and said connection when the snap-spring is in its lower position of stable equilibrium, whereby when said "on" coil is energized the lower end of the plunger directly abuts the lower shaft shoulder and moves the snap-spring without any lost motion taking place therebetween, to a position just beyond dead center, and when said "off" coil is energized the upper end of said plunger directly abuts the upper shaft shoulder and moves the snap-spring in the reverse direction without any lost motion taking place therebetween, to a position just beyond dead center.

3. In a vertically-positioned solenoid assembly, an "on" coil; an "off" coil mounted above said "on" coil having a diameter substantially equal to that of said "on" coil disposed coaxially therewith; a single shell of magnetic material encasing said "on" coil and said "off" coil; a spacing disc of magnetic material holding said coils separated from one another; end plates of magnetic material disposed against the outer coil ends and against the ends of said magnetic shell; said shell, said spacing disc, and said end plates completing the magnetic circuit about said coils; a plunger of magnetic material movable within said coils responsive to the respective magnetic fluxes thereof, said plunger having a central axial bore therethrough; a shaft of non-magnetic material positioned for axial movement within the bore of said plunger, said shaft having an upper shoulder thereon above the upper end of said plunger, and a lower shoulder thereon below the lower end of said plunger to limit movement of said shaft within the bore of said plunger and to cooperate with said plunger for movement of said shaft thereby; and a snap-spring, having an upper and a lower position of stable equilibrium, connected to said shaft for providing continuing movement of said shaft in the same direction after limited initial movement thereof by the plunger to a position just beyond dead center of said snap-spring; said lower shoulder being positioned on said shaft above its connection with the snap-spring a distance equal to the distance between the lower end of said plunger in its "off" position and said connection when the snap-spring is in its upper position of stable equilibrium; and the upper shoulder being positioned on said shaft above its connection with the snap-spring a distance equal to the distance between the upper end of the plunger in its "on" position and said connection when the snap-spring is in its lower position of stable equilibrium, whereby when said "on" coil is energized the lower end of the plunger directly abuts the lower shaft shoulder and moves the snap-spring without any lost motion taking place therebetween, to a position just beyond dead center, and when said "off" coil is energized the upper end of said plunger directly abuts the upper shaft shoulder and moves the snap-spring in the reverse direction without any lost motion taking place therebetween, to a position just beyond dead center.

JOHN B. CATALDO.
KENNETH E. VROOM.

REFERENCES CITED

The following references are of record in the file of this patent:

UNITED STATES PATENTS

| Number | Name | Date |
| --- | --- | --- |
| 1,382,412 | Campbell | June 21, 1921 |
| 1,434,637 | Tuck | Nov. 7, 1922 |
| 1,571,401 | Erickson | Feb. 2, 1926 |
| 2,335,888 | Stilwell | Dec. 7, 1943 |
| 2,450,924 | Stilwell | Oct. 12, 1948 |

FOREIGN PATENTS

| Number | Country | Date |
| --- | --- | --- |
| 163,115 | Switzerland | Oct. 2, 1933 |